M. E. DRISCOLL.
ATTACHMENT FOR CUTTING FIGURES ON FABRICS.
APPLICATION FILED JAN. 12, 1917.

1,225,596.

Patented May 8, 1917.
4 SHEETS—SHEET 1.

WITNESSES

INVENTOR
M. E. Driscoll
BY
ATTORNEYS

M. E. DRISCOLL.
ATTACHMENT FOR CUTTING FIGURES ON FABRICS.
APPLICATION FILED JAN. 12, 1917.
1,225,596.
Patented May 8, 1917.
4 SHEETS—SHEET 2.
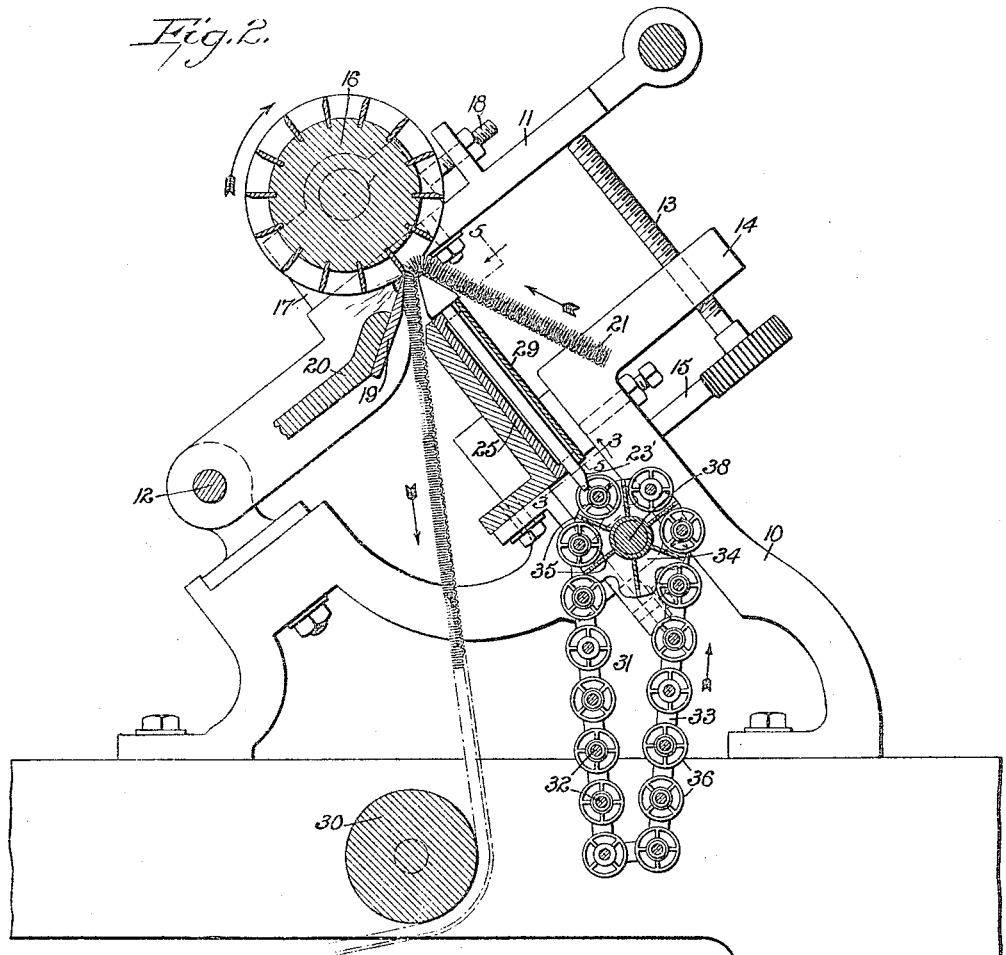
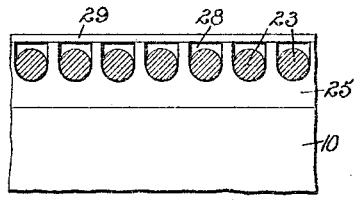
WITNESSES
Oliver W. Holmes
G. L. Beeler
INVENTOR
M. E. Driscoll
BY
ATTORNEYS

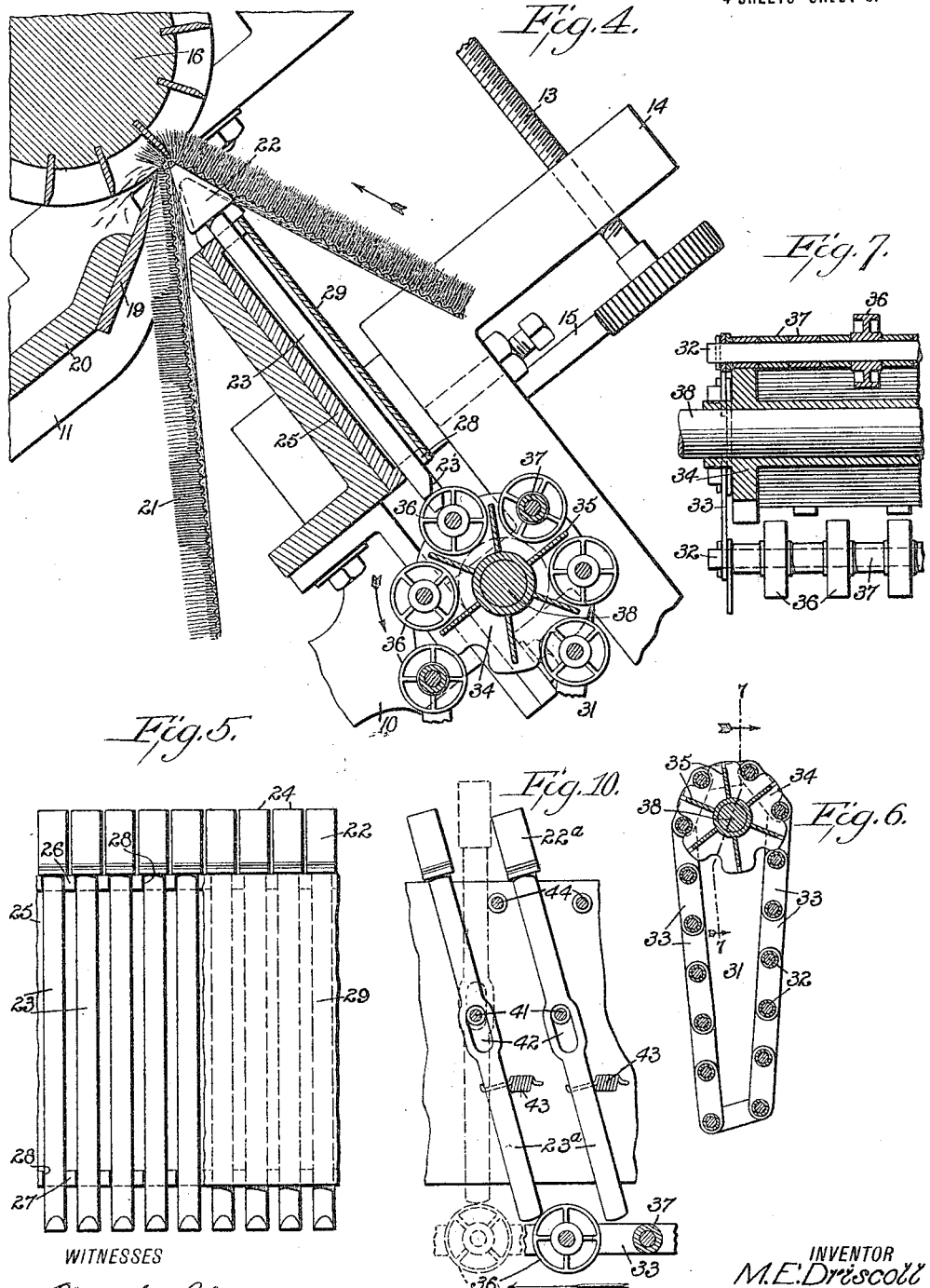

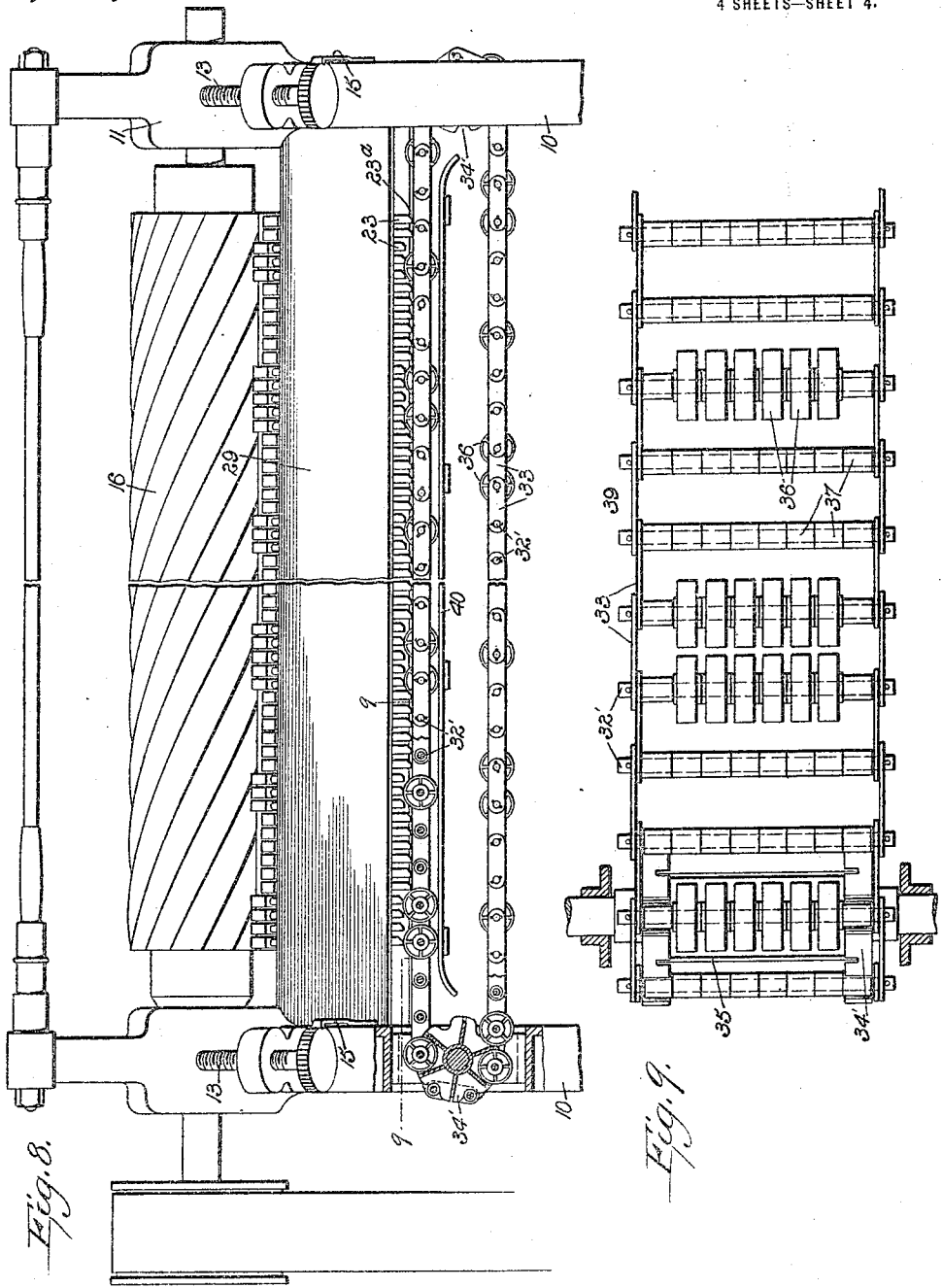

UNITED STATES PATENT OFFICE.

MICHAEL E. DRISCOLL, OF SOMERVILLE, NEW JERSEY.

ATTACHMENT FOR CUTTING FIGURES ON FABRICS.

1,225,596.　　　　Specification of Letters Patent.　　Patented May 8, 1917.

Application filed January 12, 1917.　Serial No. 141,987.

*To all whom it may concern:*

Be it known that I, MICHAEL E. DRISCOLL, a citizen of the United States, and a resident of Somerville, in the county of Somerset and State of New Jersey, have invented a new and Improved Attachment for Cutting Figures on Fabrics, of which the following is a full, clear, and exact description.

This invention relates to the manufacture and finishing of fabrics and has particular reference to the treatment of pile fabrics such as carpets, plushes, felts, shawls or any other fabric, the pile of which is to be trimmed, cut or shorn.

Among the objects of the invention, therefore, is to provide an attachment for a fabric shear whereby the cutting or shearing of the pile may be performed according to any desired design or regular configuration.

Another object of the invention is to provide a cutting attachment for fabric shears including a series or row of plungers movable relatively to one another and independently of one another toward or from the movable cutting member, said plungers serving to project any desired portions of the fabric toward the cutter so that the pile from such portions will be clipped or cut to any desired extent.

Another object of the invention is to provide means in connection with said plungers or their equivalent to control the action or position thereof according to the desired design to be cut in the fabric, said means including an endless chain or belt of actuators of greater or less size or diameter, said actuators being positioned to be staggered or arranged on the belt in such a manner as to correspond to the design to be effected in the finished product.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Fig. 2 is a vertical transverse section of the same on the line 2—2;

Fig. 3 is a sectional detail on the line 3—3 of Fig. 2;

Fig. 4 is a detail view on an enlarged scale somewhat similar to Fig. 2, but taken on the line 4—4 of Fig. 1;

Fig. 5 is a detail view partly in section as seen from the broken line 5—5 of Fig. 2;

Fig. 6 is a vertical transverse section on the line 6—6 of Fig. 1;

Fig. 7 is a vertical longitudinal section of the left-hand end of the actuator belt taken on a plane corresponding substantially to the line 7—7 of Fig. 6;

Fig. 8 is a view corresponding substantially to Fig. 1, but indicating a modified form of the improvement;

Fig. 9 is a detail plan view of the left-hand end of the modified form of actuator belt as seen on the line 9—9 of Fig. 8; and Fig. 10 is a detail view of a further modification.

Figure 1:
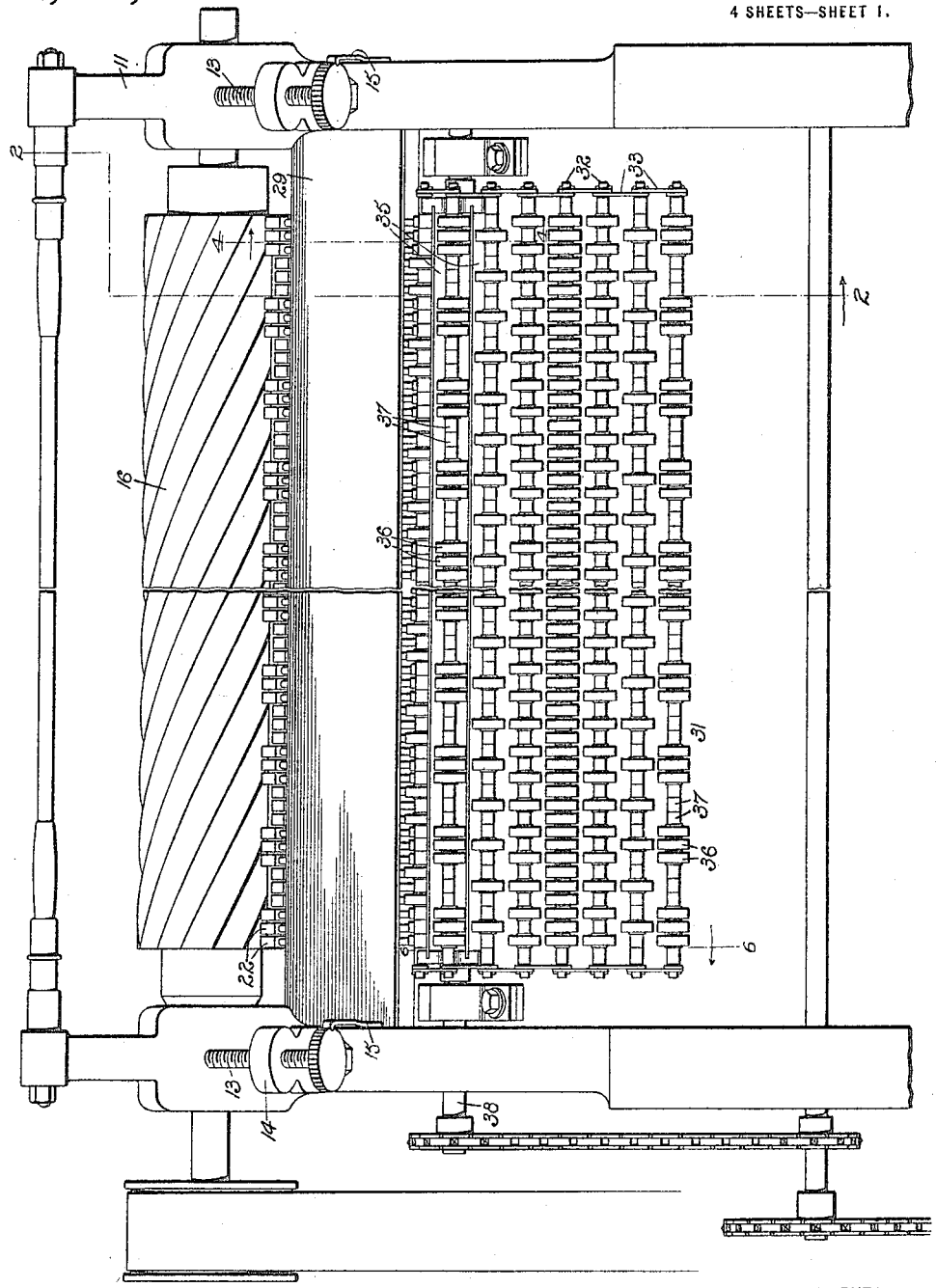
Figure 1 is a front elevation of a portion of any suitable machine commonly called in the art a shear and having one form of my improvement attached thereto.

Referring now more particularly to the drawings, I show a shear comprising a frame 10, a cutter frame 11 hung upon a longitudinal axis 12 at the rear portion of the main frame and adjustable up or down with respect to the main frame by adjustment screws 13, or their equivalent, tapped through lugs or projections 14 of the main frame and locked from accidental rotation by keepers 15. 16 indicates a rotary cutter of any convenient or well known construction, the same being journaled in adjustable boxes 17 upon the cutter frame 11, the adjustment being effected in a direction perpendicular to the plane of the axis of the screws 13, by means of screws or bolts 18. By this adjustment the position of the rotary cutter is determined with reference to the relatively fixed blade 19 secured at 20 upon the cutter frame. The former adjustment, however, through the screws 13 determines the position of the cutting device up and down or toward and from the fabric rests or plunger mechanism described in detail below and carried by relatively fixed devices upon the main frame.

21 indicates a piece of pile fabric passing in the direction of the arrows through the machine for the purpose of trimming or shearing either the loose ends of the pile only or for simultaneously trimming off the loose ends of the pile and the shearing of certain portions of the pile to a shorter length to produce upon the finished pile surface certain predetermined ornamental configuration. For a complete comprehension of this description it will be necessary, of course, to bear in mind that the fabric is adapted to flex with comparative freedom both longitudinally and laterally. That is to say, both Figs. 2 and 4 indicate the fabric making a comparatively sharp angle longitudinally, the apex of the angle being directed toward and in close proximity to the coöperating portions of the rotary and stationary cutting members, while Fig. 4 indicates also the fact that the fabric is subjected to flexure transversely, different parts of the fabric along the same horizontal line being disposed at different distances from the cutter blades while passing beneath them.

The plungers referred to above are indicated in detail in Figs. 4 and 5 and each comprises a head 22 and a shank 23. The heads are dart or wedge shaped with their active edges or ends 24 lying normally in a straight line transverse of the machine and at such distance from the rotary cutter as will insure that only the loose ends of the pile will be sheared by the cutter. The heads being rectangular in transverse section and being located close together, each to each, no other special means is necessary to prevent rotation of their shanks 23 in the bed plate 25 which supports them. Said plate is provided with upwardly and forwardly projecting flanges 26 and 27 provided with pairs of alined notches 28 in which said shanks 23 lie and glide longitudinally. A face plate 29 lies over all of the shanks holding them in place. The fabric 21 is drawn or actuated over the edges or points 24 of the plungers by any suitable mechanism and beneath a roller 30, these parts being actuated coincidentally with the operation of the cutter 16, the position of the roller determining the form of the fabric with respect to the coöperating cutter blades and the points of the plungers.

Any suitable actuating means may be provided to reciprocate the plungers toward the rotary cutter either singly or in multiple according to the design to be produced on the fabric. I provide, however, for this purpose an endless chain or belt of rotary cutters operated by any suitable means at any desired speed beneath the lower ends of the plunger shanks and preferably along lines perpendicular to the axes of said shanks. This actuator belt is indicated as a whole in Figs. 1 and 2 at 31, the same comprising an endless series of bars 32 extending transversely of the machine parallel to each other and equally spaced each from the next. The spacing of the bars and the actuation thereof are effected by means of links 33 connected to the ends of the bars. The upper bight of the belt operates over the drum 34 or roller having head wheels constituting sprocket wheels, between which extend a series of radial webs 35 forming as many trough-like depressions longitudinally of the drum or roller 34. It will be understood, particularly with reference to Figs. 6 and 7, that the ends of the bars 32 with their connecting links coöperate with the end wheels of the drum the same as any ordinary sprocket gear, and that the bars 32 while passing over the drum occupy positions with their axes in the radial planes bisecting the respective troughs.

Each bar 32 has threaded or slipped upon it as many actuator rollers or spacers as there are plungers, beneath which the respective rollers or spacers pass while the belt is actuated as a whole in a circuit around the axis of the drum 34. The actuator rollers are indicated at 36 and the spacers at 37. The diameter of the actuators may be varied from the maximum down to the diameter of the spacers, but the maximum diameter of the actuators is so designed that each actuator coöperating with the beveled lower end 23′ of a plunger shank will project such plunger with that portion of the fabric passing at such moment over the point 24 thereof and effect the deepest cut of the cutting blades in the pile. Those portions of the fabric at the sides of the projected plunger, by reason of the lateral flexibility of the fabric, will remain spaced from the cutter, as indicated in Fig. 4. The drum or roller 34 is adapted to be actuated through its supporting shaft 38 by any suitable means and preferably at a relatively high speed, so that if adjacent bars 32 carry actuator rollers 36 in the same plane of any specified plunger, the effect of any succeeding actuator is to maintain the plunger projected substantially at the place where the preceding actuator projected it. In other words, as viewed in Fig. 4, while the actuator 36 is acting upon a plunger thereby effecting the cutting of a depression in the fabric, this effect of the now acting actuator will be followed so quickly by the next one in turn if it is in the same plane as to hold the plunger elevated. From Fig. 1 it will be obvious that the actuators 36 may be staggered or arranged with respect to the face of the belt 31 so as to provide any desired design for the finished product.

In Figs. 8 and 9, the actuator belt 39 is of a slightly different character with respect to its direction of movement, the direction of movement being transverse of the machine instead of longitudinal or vertical, as in the other form. In this modification the belt is operated over two drums or rollers 34′ journaled in the side members of the frame 10, the plane intersecting the axes of these rollers being perpendicular to the plane of the plungers. The belt 39 in its general construction is similar to the belt 31 in that it includes an endless series of bars 32' connected by links 33 and by them held equally spaced. The bars, however, may be comparatively short and carry relatively few of the actuators 36 and spacers 37. In this adaptation of the invention, the actuators 36 move laterally against the lower beveled ends 23ª of the plunger shanks. The actuation part of the belt or that run which carries the active actuators is supported upon a fixed guide 40, whereby all of the axes of the rods 32' in this run of the belt will be kept in a true plane perpendicular to the plane of the plungers. As in the other form of the invention, the position or arrangement of the actuators 36 in this form of the invention will determine the configuration of the design cut in the pile of the fabric passing over the plungers.

In the modification of Fig. 10, the plungers 23ª are pivoted upon fixed pivots 41 as well as being adapted to reciprocate endwise. The heads 22ª of the plungers therefore are adapted to move through arcs of circles around the centers of the pins 41 from the normal position indicated in full lines in this figure. The actuators 36 move in a manner similar to that shown in Figs. 8 and 9, or in a plane transverse of the machine. Each plunger is provided with a slot 42 providing for endwise movement of the plunger incident to the passing of the actuator 36 beneath the lower end thereof, as indicated in dotted lines. With the actuator belt or chain operating as indicated by the arrow, the first effect of the actuator 36 is to cause the plungers to be rotated around their axes against the force of the springs 43, until they are stopped by the stop pins 44. Then the actuators will roll beneath the plungers, causing them to be lifted. After the actuator has passed beneath each plunger, such plunger will be returned to its normal position by the spring attached thereto, ready for a subsequent actuation.

I claim:

1. The combination in a pile fabric shear, with cutting devices for clipping the ends of the pile and a frame supporting the cutting devices, of a series of plungers supported upon the frame with their ends adjacent to the line of coöperation between the cutting devices, and actuator means coöperating selectively with the several plungers for reciprocating the same individually toward the cutting devices.

2. In a pile fabric shear, the combination with a main frame, a cutter frame adjustably secured thereon and relatively movable cutting devices carried by the cutter frame, of a series of dart-like plungers arranged with their axes in the same plane and directed so as to intersect the cutting devices, means supporting the plungers upon the main frame adapting any or all of them to be reciprocated longitudinally, and an endless actuator belt operating beneath and in contact with the ends of the plungers remote from the cutting devices to reciprocate the plungers selectively, substantially as set forth.

3. In a pile fabric shear, the combination with a main frame, a cutter frame secured thereon and cutting devices including a rotary cutter supported upon the cutter frame, of a series of plungers located in a single plane extending transversely of the machine and intersecting the rotary cutter, the ends of the plungers being spaced normally slightly from the rotary cutter to permit the fabric to be drawn therebetween and a plurality of actuators movable beneath the ends of the plungers remote from the cutter to selectively reciprocate the plungers toward the cutter so as to cause the shearing of the pile from certain portions of the fabric to a greater extent than others, and means to operate the actuators for uniform predetermined results with respect to the fabric passing over the plungers.

4. In a pile fabric shear, the combination with a main frame, an actuator frame supported thereon and cutting devices including a stationary belt and a rotary cutter coöperating along a line transverse of the machine, of a series of plungers arranged with their axes in a certain plane transverse of the machine and with the points of the plungers lying along a line normally spaced from but parallel to the line of coöperation between the cutter elements, the fabric being treated being adapted to pass between the points of the plungers and said cutting line, and means to reciprocate any or all of the plungers selectively and independently of one another toward said cutting line whereby the parts of the fabric thus moved toward the cutting line will be clipped shorter than other portions.

5. In an attachment of the character set forth, the combination of a series of plungers arranged parallel to one another and over which the fabric is adapted to be drawn, means to support said plungers for endwise reciprocation, and means for reciprocating the plungers comprising an endless actuator belt carrying a plurality of larger and smaller rollers movable beneath the ends of the plungers.

6. In an attachment for pile fabric shears, the combination of a frame, a bed plate secured thereon, a series of plungers supported on the bed plate and guided thereby for endwise individual reciprocation, a face plate holding the plungers in place and limiting the movement thereof to that of reciprocation and means to reciprocate the plungers selectively and individually, said means comprising an endless belt comprising endless series of parallel bars, links connecting the ends of the bars holding them in equally spaced parallel relation and a plurality of larger and smaller rollers strung upon the bars, and means to actuate the belt so as to cause the bars and rollers to pass beneath the plungers along a predetermined path.

MICHAEL E. DRISCOLL.

Copies of this patent may be obtained for five cents each, by addressing the "Commissioner of Patents, Washington, D. C."